(12) United States Patent
Zelman

(10) Patent No.: US 7,537,336 B2
(45) Date of Patent: May 26, 2009

(54) LENSES REMOVABLY SECURED TO AN EYEWEAR PLATFORM

(76) Inventor: Gary Martin Zelman, 997 Flower Glen Rd., Simi Valley, CA (US) 93065

(*) Notice: Subject to any disclaimer, the term of this patent is extended or adjusted under 35 U.S.C. 154(b) by 0 days.

(21) Appl. No.: 11/531,073

(22) Filed: Sep. 12, 2006

(65) Prior Publication Data

US 2007/0008486 A1    Jan. 11, 2007

Related U.S. Application Data

(62) Division of application No. 11/168,138, filed on Jun. 27, 2005, now abandoned.

(51) Int. Cl.
*G02C 9/00* (2006.01)
(52) U.S. Cl. .................. 351/47; 351/57; 351/106
(58) Field of Classification Search ............... 351/47, 351/48, 57, 58, 41, 44, 103–109
See application file for complete search history.

(56) References Cited

U.S. PATENT DOCUMENTS 3,838,914 A * 10/1974 Fernandez ............... 351/106
6,866,386 B1 * 3/2005 Chen ....................... 351/103
7,014,313 B1 * 3/2006 Lee et al. .................. 351/47

* cited by examiner

Primary Examiner—Huy K Mai
(74) Attorney, Agent, or Firm—Trojan Law Offices

(57) ABSTRACT

Eyewear is provided having lenses that are removably secured to an eyewear platform. The eyewear platform has a bridge portion, a pair of temple extensions and at least one socket extending therefrom with a first mating surface accessible on an upper side of the platform and a second mating surface accessible on a lower side of the platform. The eyewear further includes a pair of primary lenses with at least one third mating surface that is removably secured to the first mating surface by magnetic attraction. The eyewear still further includes a pair of auxiliary lenses with at least one fourth mating surface that is removably secured to the second mating surface by magnetic attraction. The eyewear further includes a reflective coating on a portion of a surface of either the primary or auxiliary lenses to facilitate rearward view of a wearer.

4 Claims, 15 Drawing Sheets

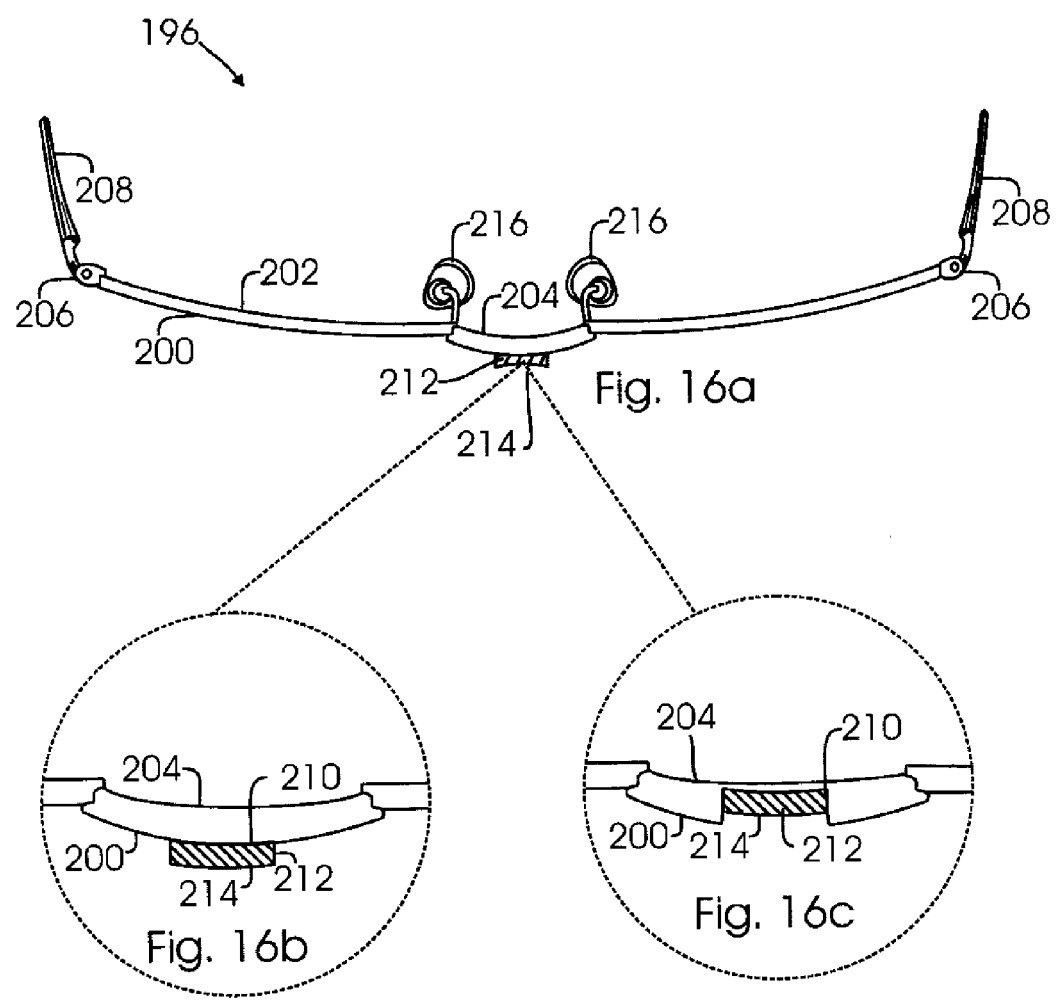

LENSES REMOVABLY SECURED TO AN EYEWEAR PLATFORM

CROSS REFERENCE TO RELATED APPLICATIONS

This is a divisional application from and claims priority to U.S. Ser. No. 11/168,138, filed Jun. 27, 2005 now abandoned.

FIELD OF THE INVENTION

The invention relates to eyewear and, more particularly, to eyewear having lenses that are removably secured to an eyewear platform.

BACKGROUND OF THE INVENTION

Auxiliary eyeglasses include a pair of lenses that attach to primary (or conventional) eyeglasses. Especially popular are auxiliary eyeglasses with a pair of tinted lenses that convert primary eyeglasses to sunglasses because they allow a user to usually avoid the need to obtain two separate prescription lenses and two separate sets of glasses. Another type of auxiliary eyeglasses includes a pair of lenses that add to or subtract from the prescription strength of the pair of lenses on the primary eyeglasses and thereby alter the user's ultimate vision through the lenses. This type of auxiliary eyeglasses can be used as an alternative to bifocal lenses or when a user has an increase or decrease in prescription but does not want to obtain a new pair of primary eyeglasses. Still another type of auxiliary eyeglasses includes a pair of lenses that are both tinted and add to or subtract from the prescription strength of the primary eyeglasses.

Auxiliary lens attachments, which connect to a primary lenses, are well known in the art. Many current designs exist and include the use of magnetic members, fasteners, pin/socket assemblies and/ or clips, which may be positioned at various locations on either or both the primary and/ or auxiliary lenses. However, there are several limitations to mounting auxiliary lenses to primary lenses using conventional methods and techniques.

One major disadvantage is the fact that the auxiliary lenses must basically conform to the shape and size of the primary lenses in the primary lens frame. Accordingly, the ability to interchange various auxiliary lenses is somewhat limited. Furthermore, the known auxiliary lens attachments present further complications for users who desire to quickly attach auxiliary lenses to primary lenses, but whose hands are preoccupied with other activities, including, for example, but not limited to, driving an automobile, bicycle or boat or carrying items, including even children. Additionally, some users may require different prescriptions while engaged in different activities. For example, a user may be both nearsighted and farsighted and, therefore, require different prescriptions for driving and reading. Accordingly, the user may need to acquire two different pairs of primary lens frames and two different corresponding pairs of auxiliary lenses depending on upon the situation. Therefore, a need exists for eyewear that securely provides both auxiliary and primary lenses and that allows a user to easily and conveniently swap out either set of lenses in order to maximize flexibility and versatility.

Another disadvantage of known auxiliary lens attachments includes the additional weight and possible irritation and distraction that are added to the user's face as a result of the extra weight and bulk of the auxiliary lenses. A need exists for eyewear with removable lenses that provides a comfortable fit for the user.

Still another disadvantage of known auxiliary lens attachments includes a glare or reflection caused by having two sets of lenses so close to each other and, further, distraction to the field of vision of the user caused by the space or separation between the two sets of lenses. A need exists for eyewear with removable lenses that does not cause any glare, reflection or distraction to the field of vision of the user.

SUMMARY OF THE INVENTION

The present invention provides eyewear that has lenses that are removably secured to an eyewear platform. In the first and second preferred embodiments, the eyewear includes an eyewear platform, a pair of primary lenses and a pair of auxiliary lenses. In the first preferred embodiment, the primary lenses are secured to the upper side of the eyewear platform and the auxiliary lenses are secured to the lower side of the eyewear platform. Conversely, in the second preferred embodiment, the primary lenses are secured to the lower side of the eyewear platform and the auxiliary lenses are secured to the upper side of the eyewear platform.

In accordance with another aspect of the invention, in the first and second preferred embodiments, the eyewear platform includes at least one socket located at each temple extension. Further, in these embodiments, each socket houses a magnetic member that couples the primary and auxiliary lenses to the eyewear platform. Each magnetic member is situated within its respective socket so that its top surface forms at least one first mating surface on the upper side of the socket and its bottom surface forms at least one second mating surface on the lower side of the socket.

In the first preferred embodiment, the first mating surface is used for coupling the primary lenses to the eyewear platform from the upper side and the second mating surface is used for coupling the auxiliary lenses to the eyewear platform from the lower side. In the second preferred embodiment, the first mating surface is used for coupling the primary lenses to the eyewear platform from the lower side and the second mating surface is used for coupling the auxiliary lenses to the eyewear platform from the upper side.

In accordance with yet another aspect of the invention, in the first and second preferred embodiments, a primary lens frame is provided that facilitates coupling the primary lenses to the eyewear platform. It is contemplated that the primary lens frame has lens holders that contain the primary lenses. Further, the primary lens frame includes extensions that include at least one socket that houses a magnetic member that couples the primary lens frame to the socket of the eyewear platform. In the first preferred embodiment, each magnetic member is situated within its respective socket so that its bottom surface forms at least one third mating surface to be secured to the first mating surface by magnetic attraction. In the second preferred embodiment, each magnetic member is situated within its respective socket so that its top surface forms at least one third mating surface to be secured to the first mating surface by magnetic attraction. In an alternate embodiment, no primary lens frame is provided as the primary lenses couple to the eyewear platform.

In accordance with yet still another aspect of the invention, in the first and second preferred embodiments, an auxiliary lens frame is provided that facilitates coupling the auxiliary lenses to the eyewear platform. It is contemplated that the auxiliary lens frame has lens holders that contain the auxiliary lenses. Further, the auxiliary lens frame includes extensions that include at least one socket that houses a magnetic member that couples the auxiliary lens frame to the eyewear platform. In the first preferred embodiment, each magnetic member is situated within its respective socket so that its top surface forms at least one fourth mating surface to be secured to the second mating surface by magnetic attraction. In the second preferred embodiment, each magnetic member is situated within its respective socket so that its bottom surface forms at least one fourth mating surface to be secured to the second mating surface by magnetic attraction. In an alternate embodiment, no auxiliary lens frame is provided as the auxiliary lenses couple to the eyewear platform.

In accordance with yet still further another aspect of the invention, a rearward reflection coating is included on a portion of the rear side of the auxiliary lenses of the first and second preferred embodiments to provide an effective rear view mirror and facilitate rearward viewing by the user.

In accordance with another aspect of the invention, in the third and fourth preferred embodiments, the eyewear includes an eyewear platform and one pair of lenses that removably secure to the eyewear platform. In the third preferred embodiment, the lenses couple to the lower side of the eyewear platform. In the fourth preferred embodiment, the lenses couple to the upper side of the eyewear platform.

In accordance with still another aspect of the invention, in the third and fourth preferred embodiments, the eyewear platform includes at least one socket located at each temple extension. Further, in these embodiments, each socket houses a magnetic member that couples the lenses to the eyewear platform. In the third preferred embodiment, each magnetic member is situated within its respective socket so that its bottom surface forms at least one first mating surface on the lower side of the socket. Conversely, in the fourth preferred embodiment, each magnetic member is situated within its respective socket so that its top surface forms at least one first mating surface on the upper side of the socket. In the third preferred embodiment, the first mating surface is used for coupling the lenses to the eyewear platform from the lower side. In the fourth preferred embodiment, the first mating surface is used for coupling the lenses to the eyewear platform from the upper side.

In accordance with yet another aspect of the invention, in the third and fourth preferred embodiments, a lens frame is provided that facilitates coupling the lenses to the eyewear platform. It is contemplated that the lens frame has lens holders that contain the lenses. Further, the lens frame includes extensions that include at least one socket that houses a magnetic member that couples the lens frame to the socket of the eyewear platform. In the third preferred embodiment, each magnetic member is situated within its respective socket so that its top surface forms at least one second mating surface to be secured to the first mating surface by magnetic attraction. In the fourth preferred embodiment, each magnetic member is situated within its respective socket so that its lower surface forms at least one second mating surface to be secured to the first mating surface by magnetic attraction. In an alternate third and fourth embodiment, no lens frame is provided as the lenses couple to the eyewear platform.

In accordance with yet still further another aspect of the invention, a rearward reflection coating is included on a portion of the rear side of the lenses of the third and fourth preferred embodiments to provide an effective rear view mirror and facilitate rearward viewing by the user.

In accordance with another aspect of the invention, in the fifth preferred embodiment, eyewear is provided that includes lenses that are removably securable to an eyewear platform at a bridge location. This embodiment includes an eyewear platform, a pair of primary lenses and a pair of auxiliary lenses.

In accordance with yet another aspect of the invention, in the fifth preferred embodiment, the eyewear platform includes at least one socket located on a bridge portion. Further, in this embodiment, each socket houses a magnetic member that couples the primary and auxiliary lenses to the eyewear platform. Each magnetic member is situated within its respective socket so that its bottom surface forms at least one first mating surface on the lower side of the socket and its top surface forms at least one second mating surface on the upper side of the socket.

In the fifth preferred embodiment, the first mating surface is used for coupling the primary lenses to the eyewear platform from the lower side and the second mating surface is used for coupling the auxiliary lenses to the eyewear platform from the upper side. In an alternate fifth embodiment, the first mating surface can be used for coupling the primary lenses to the eyewear platform from the upper side and the second mating surface can be used for coupling the auxiliary lenses to the eyewear platform from the lower side.

In accordance with yet another aspect of the invention, in the fifth preferred embodiment, a primary lens frame is provided that facilitates coupling the primary lenses to the eyewear platform. It is contemplated that the primary lens frame has lens holders that contain the primary lenses. Further, the primary lens frame includes a bridge portion that includes at least one socket that houses a magnetic member that couples the primary lens frame to the socket of the eyewear platform. In the fifth preferred embodiment, each magnetic member is situated within its respective socket so that its top surface forms at least one third mating surface to be secured to the first mating surface by magnetic attraction. In the alternate fifth embodiment, each magnetic member is situated within its respective socket so that its bottom surface forms at least one third mating surface to be secured to the first mating surface by magnetic attraction. In an alternate embodiment, no primary lens frame is provided as the primary lenses couple to the eyewear platform.

In accordance with yet still another aspect of the invention, in the fifth preferred embodiment, an auxiliary lens frame is provided that facilitates coupling the auxiliary lenses to the eyewear platform. It is contemplated that the auxiliary lens frame has lens holders that contain the auxiliary lenses. Further, the auxiliary lens frame includes a bridge portion that includes at least one socket that houses a magnetic member that couples the auxiliary lens frame to the eyewear platform. In the fifth preferred embodiment, each magnetic member is situated within its respective socket so that its bottom surface forms at least one fourth mating surface to be secured to the second mating surface by magnetic attraction. In the alternate fifth embodiment, each magnetic member is situated within its respective socket so that its top surface forms at least one fourth mating surface to be secured to the second mating surface by magnetic attraction. In an alternate embodiment, no auxiliary lens frame is provided as the auxiliary lenses couple to the eyewear platform.

In accordance with another aspect of the invention, in the sixth preferred embodiment, the eyewear includes an eyewear platform and one pair of lenses that removably secure to the eyewear platform. In the sixth preferred embodiment, the lenses couple to the front side of the eyewear platform. In an alternate embodiment, the lenses can couple to the rear side of the eyewear platform.

In accordance with still another aspect of the invention, in the sixth preferred embodiment, the eyewear platform includes at least one socket located at a bridge portion. Further, in this embodiment, each socket houses a magnetic member that couples the lenses to the eyewear platform. In the sixth preferred embodiment, each magnetic member is situated within its respective socket so that its top surface forms at least one first mating surface on the front side of the socket. Conversely, in the alternate embodiment, each magnetic member is situated within its respective socket so that its top surface forms at least one first mating surface on the rear side of the socket. In the sixth preferred embodiment, the first mating surface is used for coupling the lenses to the eyewear platform from the front side. In the alternate embodiment, the first mating surface is used for coupling the lenses to the eyewear platform from the rear side.

In accordance with yet another aspect of the invention, in the sixth preferred embodiment, a lens frame is provided that facilitates coupling the lenses to the eyewear platform. It is contemplated that the lens frame has lens holders that contain the lenses. Further, the lens frame includes a bridge portion that includes at least one socket that houses a magnetic member that couples the lens frame to the socket of the eyewear platform. In the sixth preferred embodiment, each magnetic member is situated within its respective socket so that its bottom surface forms at least one second mating surface to be secured to the first mating surface by magnetic attraction. In the alternate sixth embodiment, each magnetic member is situated within its respective socket so that its top surface forms at least one second mating surface to be secured to the first mating surface by magnetic attraction. In an alternate sixth embodiment, no lens frame is provided as the lenses couple to the eyewear platform.

Numerous advantages may be realized by the present invention, namely by providing one eyewear apparatus that allows a user to conveniently, easily and quickly remove and change lenses. Accordingly, the user is able to employ one eyewear apparatus that allows for multiple and different types of lenses and that can be changed easily and quickly and still provides for a secure and stable support of the lenses. Furthermore, this instant eyewear apparatus is comfortable to wear and easy to use. Keeping a small case with different types of lenses is easier to transport that several boxes of different eyewear.

Other advantages and features of the invention will become apparent from the following description and from reference to the drawings.

BRIEF DESCRIPTION OF THE DRAWINGS

FIG. 16a illustrates a top perspective view of an alternate embodiment of an eyewear platform of eyewear in accordance with a sixth preferred embodiment of the present invention;

FIG. 16b illustrates a close-up view of a bridge portion of FIG. 16a;

FIG. 16c illustrates a close-up view of an alternate embodiment of a bridge portion of FIG. 16a;

FIG. 17b illustrates a close-up view of a bridge portion of FIG. 17a;

FIG. 18a illustrates a top perspective view of the eyewear of FIGS. 16a and 17a in a coupled position; and FIG. 18b illustrates a close-up view of a bridge portion of FIG. 18a.

DETAILED DESCRIPTION OF THE DRAWINGS

Figure 1:
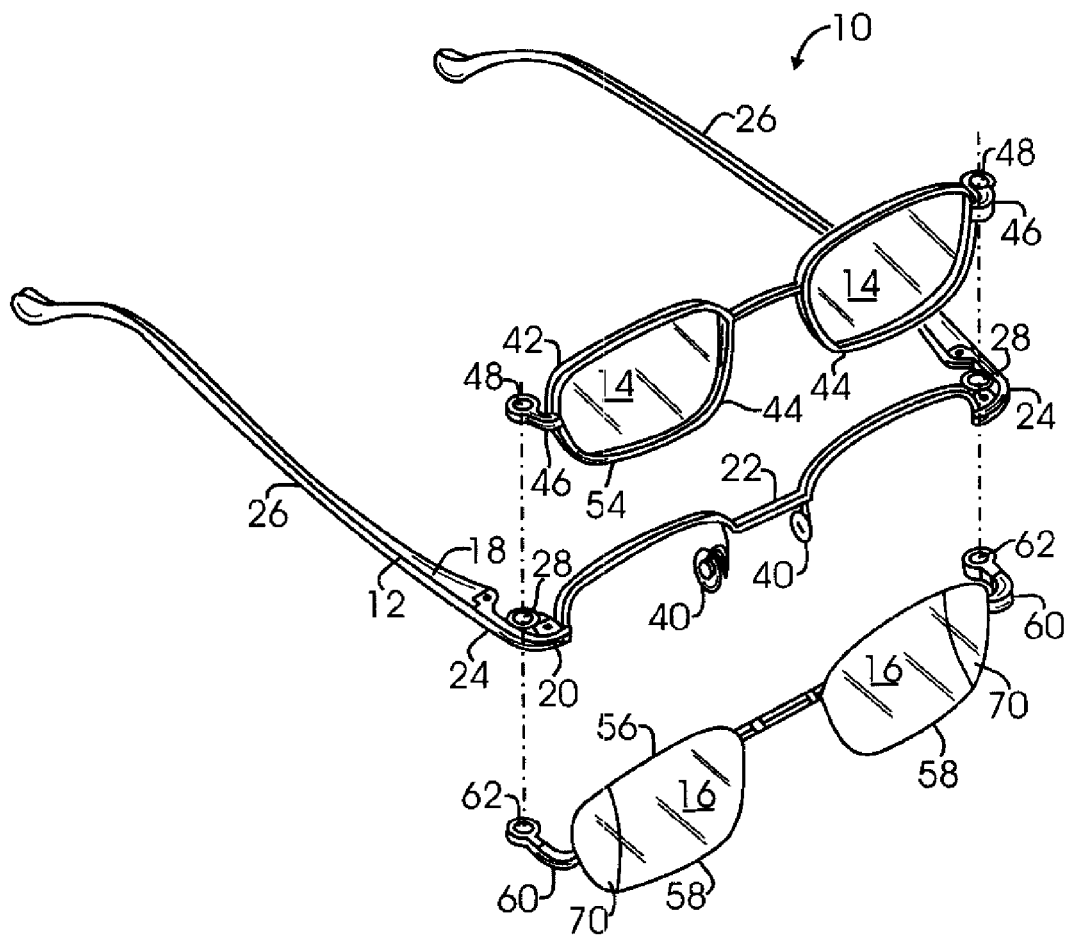
FIG. 1 illustrates an exploded view of eyewear including an eyewear platform, a primary lens frame and an auxiliary lens frame in accordance with a first preferred embodiment of the present invention.

Referring to the Figures generally and to FIGS. 1 through 4, which illustrate the first preferred embodiment, where like reference numerals denote like structure and elements, eyewear 10 that includes lenses 14 and 16 that are removably secured to an eyewear platform 12, is provided. Eyewear 10 includes eyewear platform 12, a pair of primary lenses 14 and a pair of auxiliary lenses 16.

Eyewear platform 12 has an upper side 18, a lower side 20, a bridge portion 22, a pair of temple extensions 24 and a pair of arms 26, as best illustrated in FIG. 1. Each temple extension 24 is located at an opposite end of bridge portion 22, as illustrated in FIG. 1. Arms 26 are pivotally coupled to eyewear platform 12 at each temple extension 24. Arms 26 can be adjustably connected to platform 12 through a variety of different adjustable connections including, but not limited to, a spring, hinge or joint, among other connections. Arms 26 are capable of being placed over a user's ears with bridge portion 22 resting on the user's nose to permit eyewear platform 12 to be used by a user.

Figure 3:
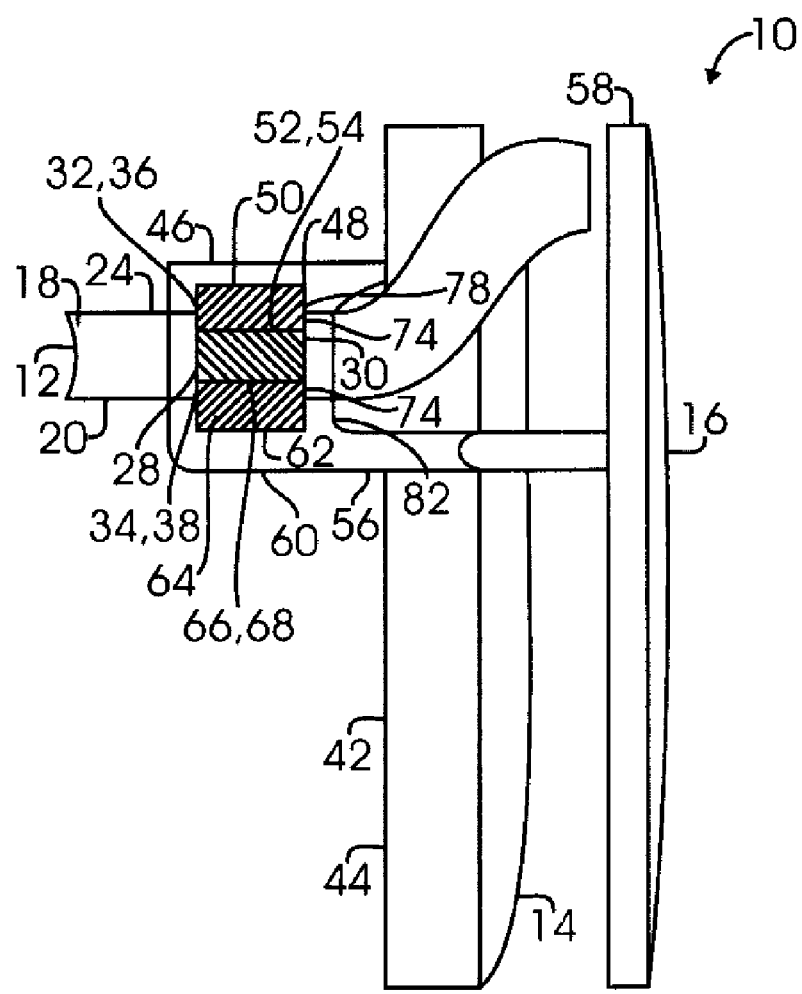
FIG. 3 illustrates a cross-sectional side view of one embodiment of the eyewear of FIG. 1 in a coupled position.
Figure 4:
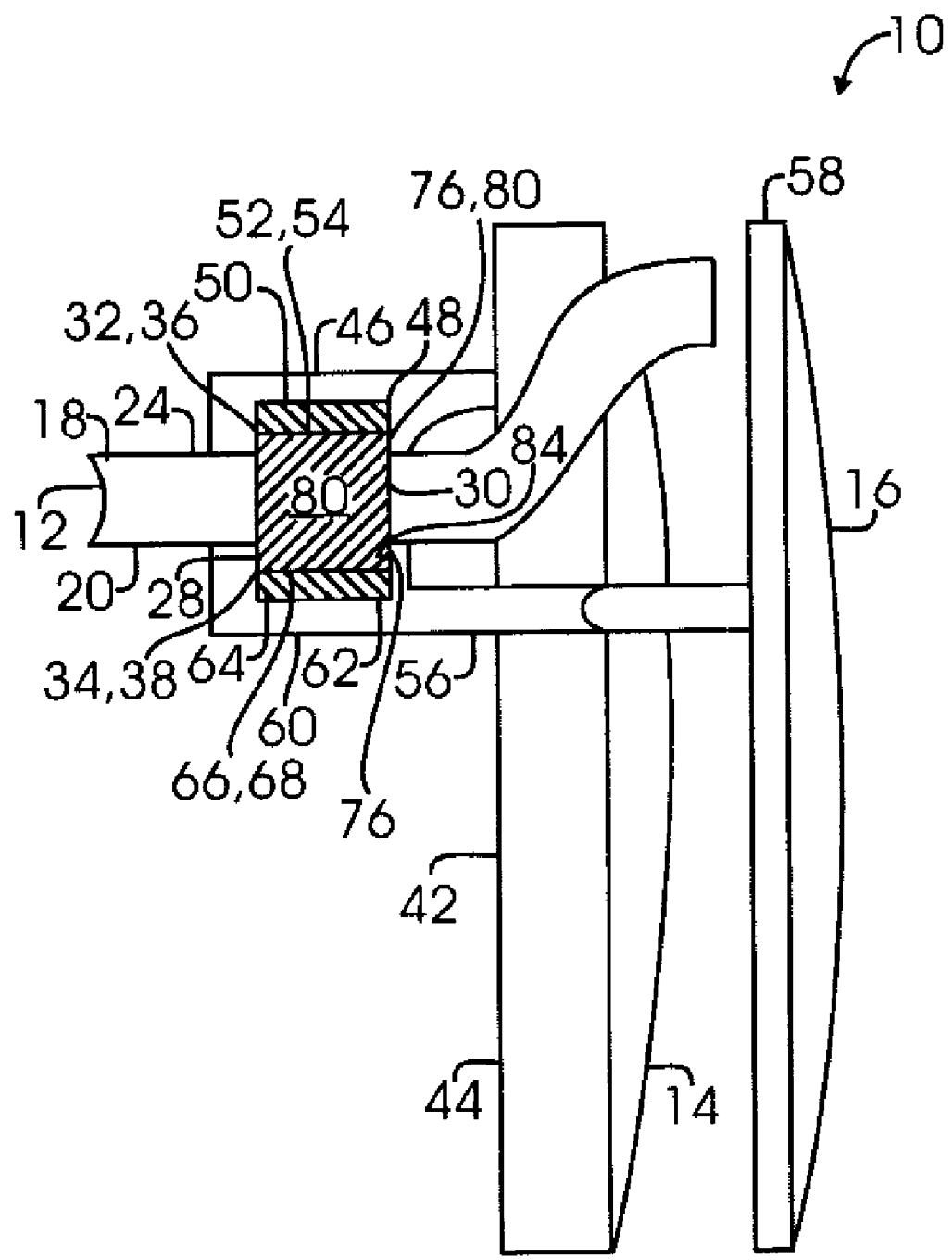
FIG. 4 illustrates a cross-sectional side view of another embodiment of the eyewear of FIG. 1 in a coupled position.

Each temple extension 24 further includes a socket 28 extending therefrom, preferably rearwardly, for coupling both primary lenses 14 and auxiliary lenses 16 to eyewear platform 12, as illustrated in FIG. 1. Socket 28 is preferably round in shape and has a magnetic member 30 securely disposed therein, as illustrated in FIGS. 3 and 4. Although socket 28 is illustrated as being circular in shape, a practitioner skilled in the art will understand that socket 28 may have any shape as known in the art and, moreover, that magnetic member 30 need not be completely surrounded by socket 28.

However, magnetic member 30 should be securely disposed within socket 28 and not removeable.

Each magnetic member 30 is preferably situated within its respective socket 28 such that both top and bottom surfaces 32 and 34, respectively, are exposed on opposite sides of socket 28 and, accordingly, forming a first mating surface 36 accessible on upper side 18 of platform 12 and a second mating surface 38 accessible on lower side 20 of platform 12. In the first preferred embodiment, first mating surface 36 is utilized for coupling primary lenses 14 to eyewear platform 12 from upper side 18 and second mating surface 38 is utilized for coupling auxiliary lenses 16 to eyewear platform 12 from lower side 20.

Eyewear platform 12 further includes nose pads 40, as illustrated in FIG. 1. It is contemplated that eyewear platform 12 will have a size and shape that may vary depending upon the material used to create platform 12. Platform 12 may be created from, for example, but not limited to, metal or plastic. Further, it is contemplated that arms 26 and nose pads 40 may be created from a like or different material. For example, nose pads 40 may be cushioned or formed of a more pliable plastic while platform 12 may be made of metal.

As further illustrated in FIG. 1, the first preferred embodiment of the present invention includes a primary lens frame 42 that has lens holders 44 that contain primary lenses 14. Although lens holders 44 as illustrated in FIG. 1 are shown as completely encircling and encompassing each lens 14, practitioners skilled in the art will understand that various embodiments may exist, including wherein only a portion of lens 14 may be contained within lens holder 44 (not shown). In a further alternate embodiment (not shown), lenses 14 are not contained in any lens holders 44 or lens frame 42.

At opposing terminal ends of primary lens frame 42 are primary frame extensions 46. Each primary frame extension 46 further comprises an extension socket 48. Each extension socket 48 is positioned such that it will align with a corresponding socket 28 in eyewear platform 12 when primary lens frame 42 is coupled to eyewear platform 12.

Each extension socket 48 in primary lens frame 42 preferably houses a magnetic member 50. Magnetic member 50 can be situated in a variety of different positions within extension socket 48 depending upon how magnetic member 30 in socket 28 of temple extension 24 is positioned. In the first preferred embodiment as shown in FIG. 1, at least one third mating surface 52 is accessible on a lower side 54 of primary lens frame 42 that is secured to first mating surface 36 by magnetic attraction and primary lenses 14 may be removably secured to platform 12.

As shown in FIG. 1, primary lens frame 42 is preferably designed to couple to eyewear platform 12 from the top and rear. In this way, primary lenses 14 in primary lens frame 42 extend from just behind eyewear platform 12. Practitioners skilled in the art will understand that primary lens frame 42 will have a size and shape depending upon the size and shape of eyewear platform 12 and the material used to create primary lens frame 42 may be the same as or different from the material used to create eyewear platform 12.

As further illustrated in FIG. 1, the first preferred embodiment of the present invention includes an auxiliary lens frame 56 that has lens holders 58 that contain auxiliary lenses 16. Although lens holders 58 as illustrated in FIG. 1 are shown as completely encircling and encompassing each lens 16, practitioners skilled in the art will understand that various embodiments may exist, including wherein only a portion of lens 16 may be contained within lens holder 58 (not shown) or where no lens holder 58 exists and only auxiliary lenses 16 are present (not shown).

At opposing ends of auxiliary lens frame 56 are auxiliary frame extensions 60. Each auxiliary frame extension 60 preferably curves and bends to align with a corresponding temple extension 24 of eyewear platform 12. Each auxiliary frame extension 60 further comprises an auxiliary socket 62. Each auxiliary socket 62 is positioned such that it will align with a corresponding socket 28 of eyewear platform 12.

Each auxiliary socket 62 in auxiliary lens frame 56 preferably houses a magnetic member 64. Magnetic member 64 can be situated in a variety of different positions within auxiliary socket 62, depending upon how a corresponding magnetic member 30 in socket 28 of temple extension 24 is positioned. In the first preferred embodiment as shown in FIG. 1, at least one fourth mating surface 66 is accessible on an upper side 68 of auxiliary lens frame 56 that is secured to second mating surface 38 by magnetic attraction and auxiliary lenses 14 may be removably secured to platform 12, as shown in FIGS. 3 and 4.

As shown in FIG. 1, auxiliary lens frame 56 is preferably designed to couple to eyewear platform 12 from the bottom and front. In this way, auxiliary lenses 16 in auxiliary lens frame 56 extend just in front of both primary lenses 14 and eyewear platform 12. Practitioners skilled in the art will understand that auxiliary lens frame 56 will have a size and shape depending upon the size and shape of eyewear platform 12 and the material used to create auxiliary lens frame 56 may be the same as or different from the material used to create eyewear platform 12.

Figure 2:
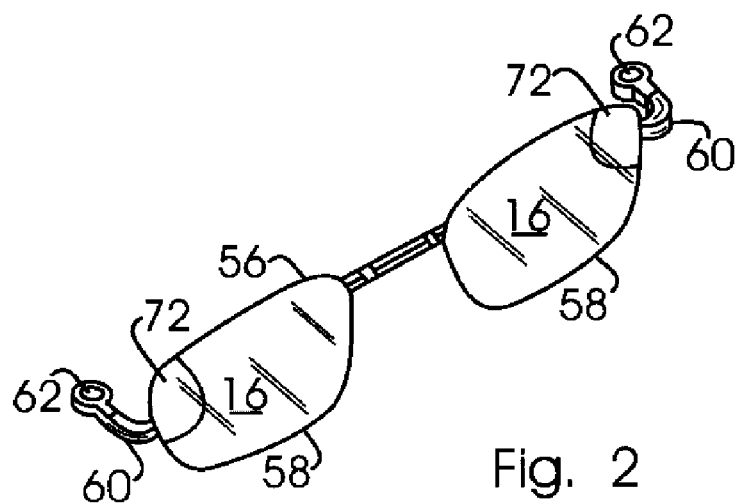
FIG. 2 illustrates an alternate embodiment of the auxiliary lens frame of the eyewear of FIG. 1.

In the first preferred embodiment of FIG. 1, a rearward reflection coating 70 is included on a portion of the rear side of auxiliary lenses 16. Preferably, reflective coating 70 is provided on an outer portion or quadrant of auxiliary lenses 16. However, a practitioner skilled in the art will understand that reflective coating 70 could be included on a primary lenses 14 (not shown), but this embodiment is less desirable because primary lenses 14 are generally clear prescription lenses. Reflective coating 70 can cover from one-fourth to one-third of lenses 16 and provide an effective rear view mirror. FIG. 2 illustrates an alternate embodiment with a reflective coating 72 that is included on only an upper portion of an outer quadrant of lenses 16 and covering only fifteen to twenty percent of lenses 16.

Referring to FIGS. 3 to 4, there is shown various cross-sectional side views of the first preferred embodiment of the present invention in order to further demonstrate the coupling of primary lens frame 42 and auxiliary lens frame 56 to eyewear platform 12. As shown in FIG. 3, magnetic member 30 may be disposed within socket 28 such that top and bottom surfaces 32 and 34, respectively, of magnetic member 30 are recessed within socket 28 and, thereby, forming recesses 74 at the top and bottom of socket 28. Alternatively, as shown in FIG. 4, magnetic member 30 may be positioned within socket 28 such that top and bottom surfaces 32 and 34, respectively, of magnetic member 30 extend above and below socket 28, thereby, creating an elevated mounting surface 76 above and below socket 28.

As explained earlier, magnetic member 50 of primary lens frame 42 may be situated in a variety of different positions within extension socket 48, depending on how magnetic member 30 is positioned within socket 28 of eyewear platform 12. For example, as illustrated in FIG. 3, if magnetic member 30 is recessed within socket 28, thereby forming recess 74 at top of socket 28, then magnetic member 50 is situated within extension socket 48 of primary lens frame 42 such that it extends outward and forms an elevated mounting surface 78 in order to fit within recess 74 and magnetically couple with magnetic member 30 when primary lens frame 42 is coupled to eyewear platform 12. Alternatively, as illustrated in FIG. 4, if magnetic member 30 is positioned within socket 28 of eyewear platform 12 such that top surface 32 of magnetic member extends above socket 28, thereby creating elevated mounting surface 76, then magnetic member 50 is recessed within extension socket 48 of primary lens frame 42, thereby forming a recess 80 such that magnetic member 30 will fit within recess 80 and magnetically couple with magnetic member 50 when primary lens frame 42 is coupled to eyewear platform 12.

Further, as explained earlier, magnetic member 64 of auxiliary lens frame 56 may be situated in a variety of different positions within auxiliary socket 62. Referring again to FIG. 3, if magnetic member 30 is recessed within socket 28 such that recess 74 is formed at the bottom of socket 28, then each magnetic member 64 is situated within its respective auxiliary socket 62 of auxiliary lens frame 56 such that it extends outward and forms an elevated mounting surface 82 that will fit within recess 74 formed at the bottom of socket 28 when auxiliary lens frame 56 is coupled to eyewear platform 12.

Alternatively, as illustrated in FIG. 4, if each magnetic member 30 is positioned within its respective socket 28 of eyewear platform 12 such that bottom surface 34 of magnetic member 30 extends below socket 28, thereby creating elevated mounting surface 76 below socket 28, then magnetic member 64 is situated within auxiliary socket 62 of auxiliary lens frame 56 such that it forms a recess 84 within auxiliary socket 62 so that magnetic member 30 fits within recess 84 and magnetically couples with magnetic member 64 when auxiliary lens frame 56 is coupled to eyewear platform 12.

Figure 5:
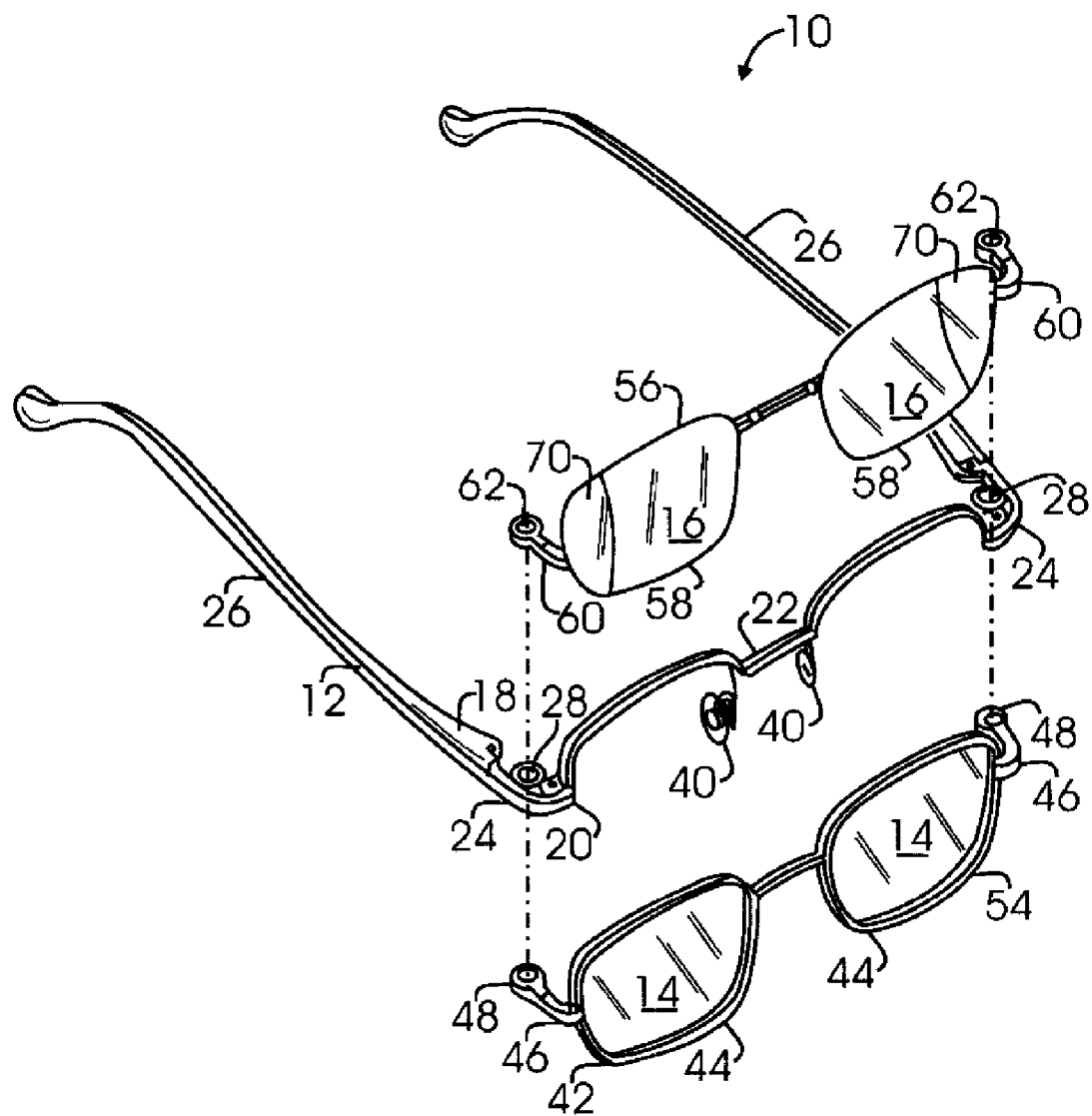
FIG. 5 illustrates an exploded view of eyewear including an eyewear platform, a primary lens frame and an auxiliary lens frame in accordance with a second preferred embodiment of the present invention.
Figure 6:
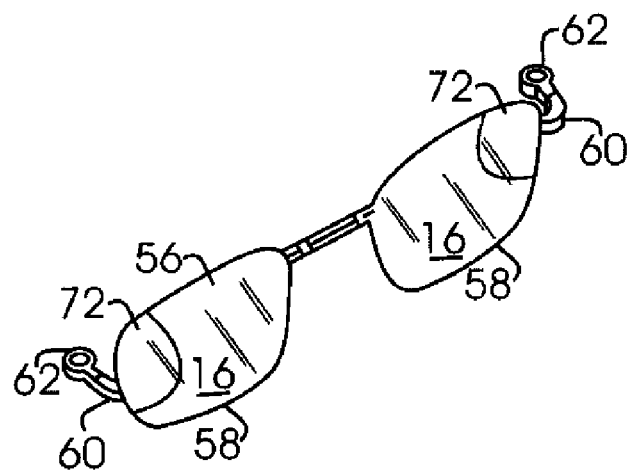
FIG. 6 illustrates an alternate embodiment of the auxiliary lens frame of the eyewear of FIG. 5.

FIG. 5 shows an exploded view of a second preferred embodiment of the present invention of eyewear 10 that includes eyewear platform 12, a primary lens frame 42 and an auxiliary lens frame 56, where primary lens frame 42 is coupled to lower side 20 of platform 12 and auxiliary lens frame 56 is coupled to upper side 18 of platform. The structure of eyewear platform 12, primary lens frame 42 and auxiliary lens frame 56 of FIGS. 5 and 6 are the same as that described with reference to FIGS. 1 and 2, except that primary magnetic member 50 of primary lens frame 42 is oriented to engage and magnetically couple with magnetic member 30 of eyewear platform 12 from lower side 20 of platform and auxiliary magnetic member 64 in auxiliary lens frame 56 is oriented to engage and magnetically couple with magnetic member 30 of eyewear platform 12 from upper side 18.

Figure 7:
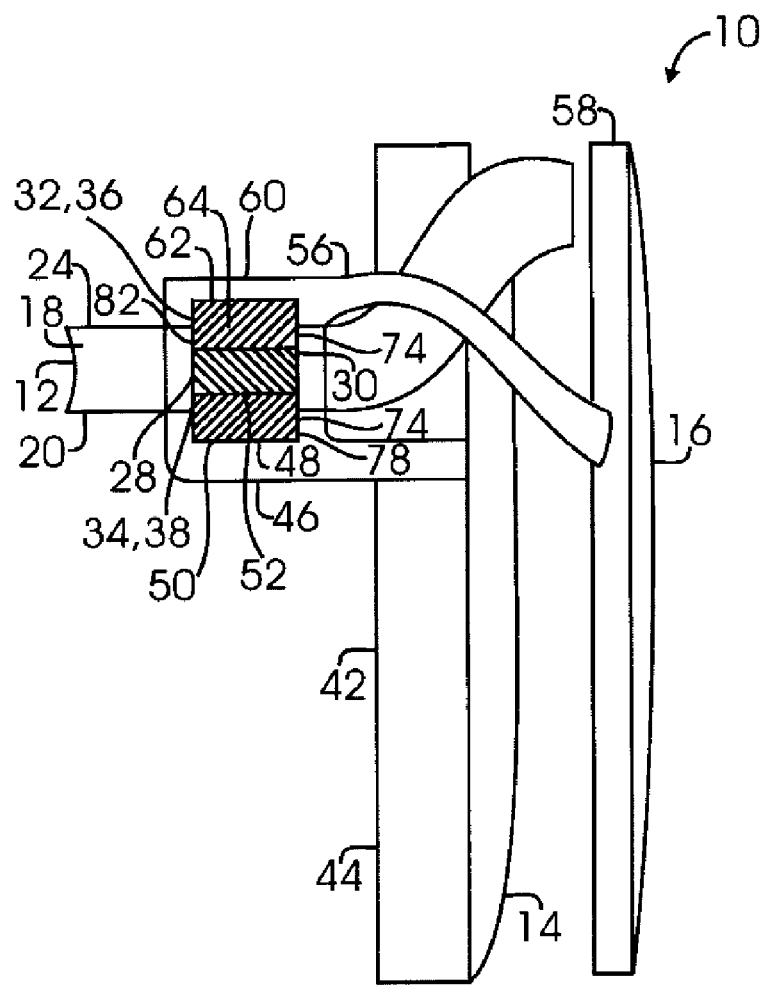
FIG. 7 illustrates a cross-sectional side view of one embodiment of the eyewear of FIG. 5 in a coupled position.
Figure 8:
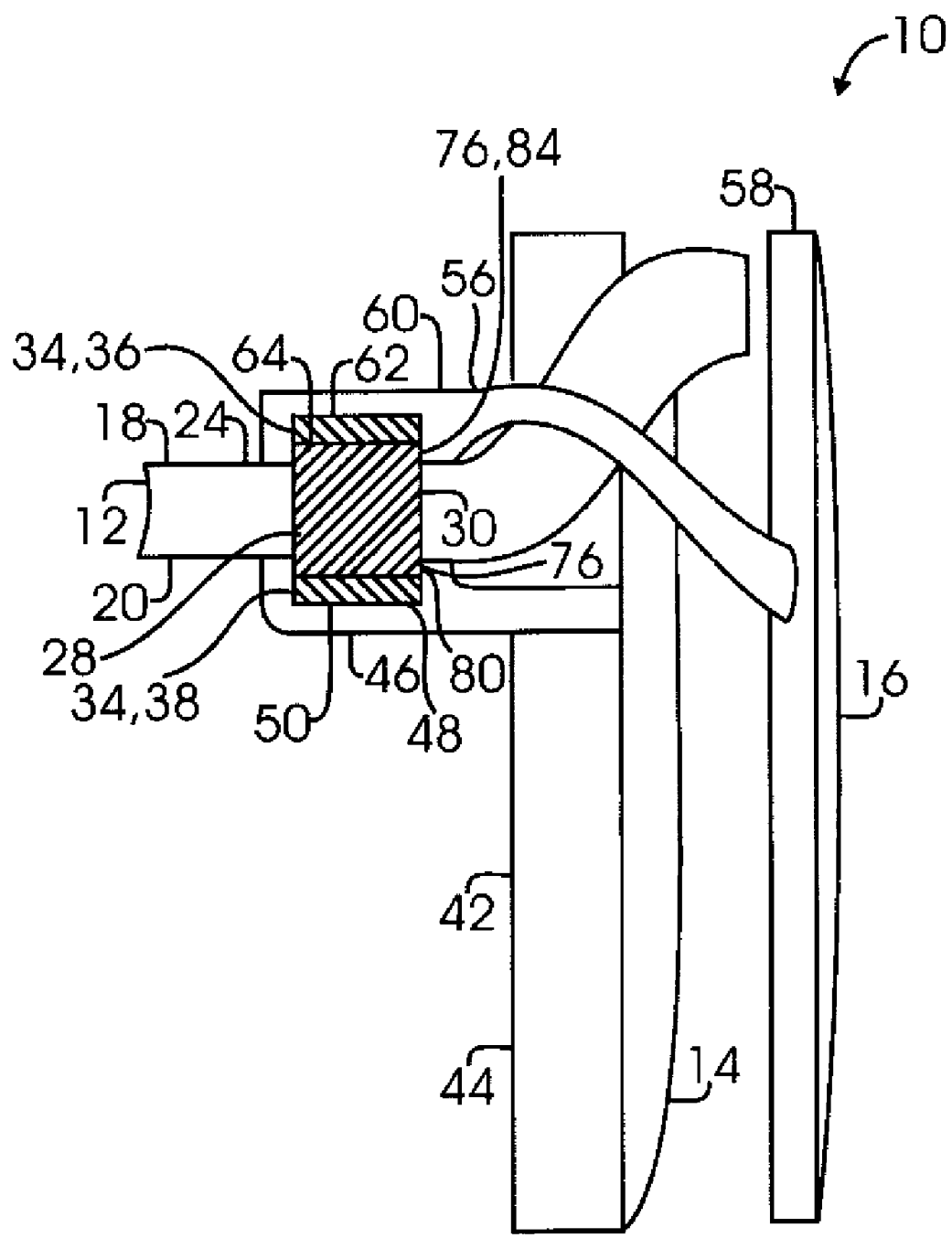
FIG. 8 illustrates a cross-sectional side view of another embodiment of the eyewear of FIG. 5 in a coupled position.

FIGS. 7 and 8 illustrate cross-sectional side views of the second preferred embodiment of eyewear 10 of the present invention in order to further demonstrate the coupling of primary lens frame 42 and auxiliary lens frame 56 to eyewear platform 12. As shown in FIG. 7, magnetic member 30 may be disposed within socket 28 of eyewear platform 12 such that it is recessed within socket 28 and thereby forms a recess 74 at the top and bottom of socket 28. Alternatively, as shown in FIG. 8, magnetic member 30 may be positioned within socket 28 of eyewear platform 12 such that top and bottom surfaces 32 and 34, respectively, of magnetic member 30 extend above and below socket 28, thereby creating an elevated mounting surface 76 above and below socket 28.

As explained earlier, in the second preferred embodiment, the structure of primary lens frame 42 is nearly identical to that set forth with reference to the first preferred embodiment as described in FIG. 1 except that primary magnetic member 50 in primary lens frame 42 couples to magnetic member 30 in eyewear platform 12 from lower side 20 of platform 12. As discussed with reference to the first preferred embodiment, primary magnetic member 50 may be situated in a variety of different positions within extension socket 48 of primary lens frame 42, depending upon how magnetic member 30 is positioned within socket 28 of eyewear platform 12.

For example, as illustrated in FIG. 7, if magnetic member 30 of eyewear platform 12 is recessed within socket 28 of eyewear platform 12 such that recess 74 is formed at the bottom of socket 28, then primary magnetic member 50 in primary lens frame 42 is situated within extension socket 48 of primary lens frame 42 such that it extends outward and upward to form elevated mounting surface 78 that fits within recess 74 and magnetically couples with magnetic member 30 when primary lens frame 42 is coupled to eyewear platform 12 from lower side 20.

Referring to FIG. 8, if magnetic member 30 is positioned within socket 28 of eyewear platform 12 such that top surface 32 of magnetic member 30 extends below socket 28, thereby creating elevated mounting surface 76, then magnetic member 50 is recessed within extension socket 48 of primary lens frame 42, thereby forming recess 80 such that magnetic member 30 will fit within recess 80 and magnetically couple with magnetic member 50 when primary lens frame 42 is coupled to eyewear platform 12.

Further, as explained earlier, magnetic member 64 may be situated in a variety of different positions within auxiliary socket 62 of auxiliary lens frame 56. As illustrated in FIG. 7, if magnetic member 30 is recessed within socket 28 such that recess 74 is formed at the top of socket 28, then each magnetic member 64 is situated within its respective auxiliary socket 62 of auxiliary lens frame 56 such that it extends outward and downward to form elevated mounting surface 82 that fits within recess 74 of socket 28 and magnetically couples with magnetic member 30 when auxiliary lens frame 56 is coupled to eyewear platform 12 from upper side 18.

Finally, as illustrated in FIG. 8, if magnetic member 30 is positioned within socket 28 of eyewear platform 12 such that top surface 32 of magnetic member 30 extends above socket 28, thereby creating elevated mounting surface 76, then magnetic member 64 is situated within auxiliary socket 62 of auxiliary lens frame 56 such that it forms recess 84 within auxiliary socket 62 so that magnetic member 30 fits within recess 84 and magnetically couples with magnetic member 64 when auxiliary lens frame 56 is coupled to eyewear platform 12.

FIGS. 9 to 12 illustrate third and fourth preferred embodiments of the present invention of eyewear 86 that includes lenses 88 that are removable secured to an eyewear platform 90. Eyewear 86 includes eyewear platform 90 and a pair of lenses 88. In the illustrated embodiment, lenses 88 are on a lens frame 92. However, in an alternate embodiment (not shown) lenses 88 may attach to platform 90 without lens frame 92.

Figure 9:
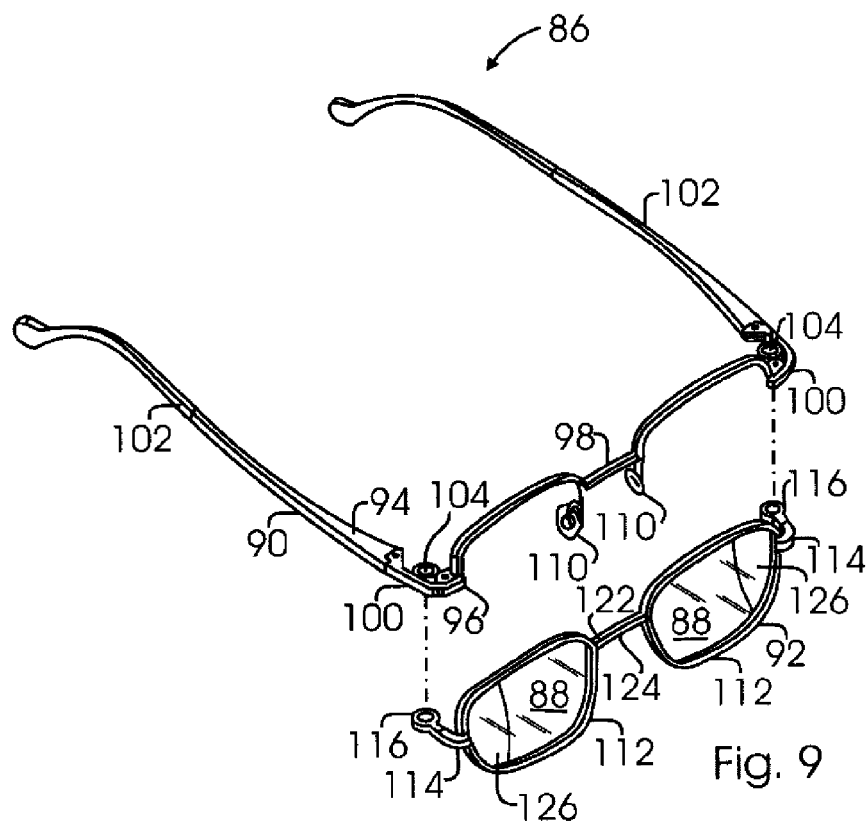
FIG. 9 illustrates an exploded view of eyewear including an eyewear platform and a removable lens frame in accordance with a third preferred embodiment of the present invention.
Figure 11:
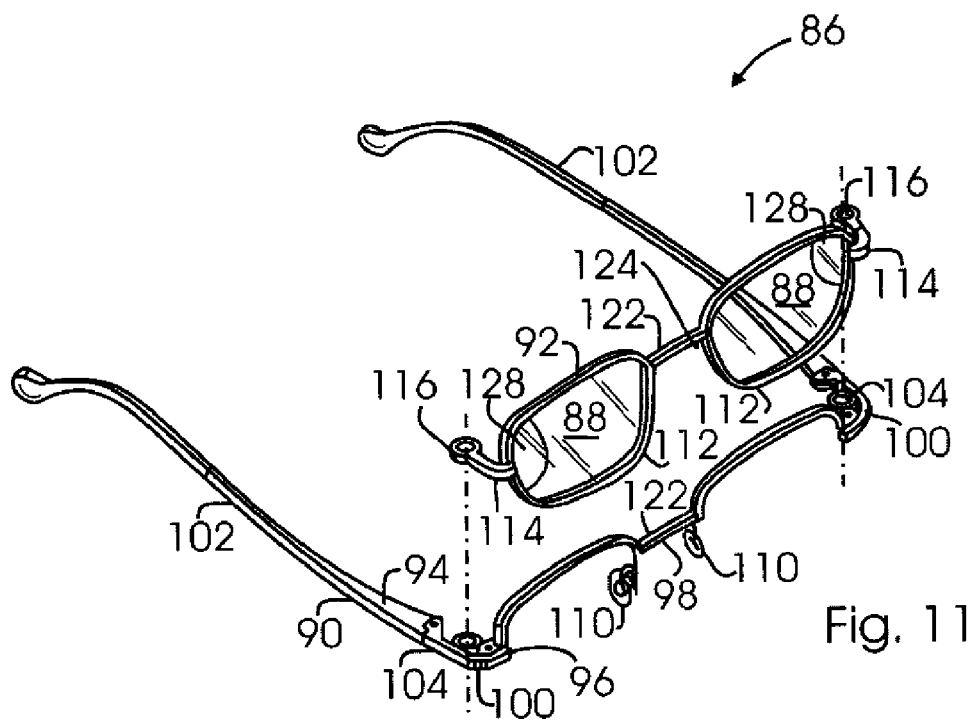
FIG. 11 illustrates an exploded view of eyewear including an eyewear platform and a removable lens frame in accordance with a fourth preferred embodiment of the present invention.

As illustrated in FIGS. 9 and 11, eyewear platform 90 has an upper side 94, a lower side 96, a bridge portion 98, a pair of temple extensions 100 and a pair of arms 102. Each temple extension 100 is located at an opposite end of bridge portion 98, as illustrated in FIGS. 9 and 11. Arms 102 are pivotally coupled to eyewear platform 90 at each temple extension 100. Arms 102 can be adjustably connected to platform 90 through a variety of different adjustable connections including, but not limited to, a spring, hinge or joint, among other connections. Arms 102 are capable of being placed over a user's ears with bridge portion 98 resting on the user's nose to permit eyewear platform 90 to be used by a user.

Figure 10:
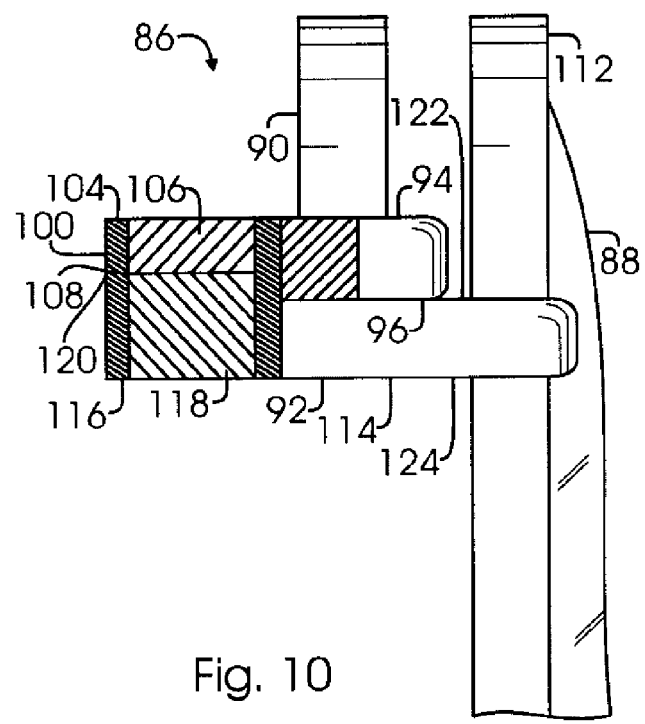
FIG. 10 illustrates a cross-sectional side view of the eyewear of FIG. 9 in a coupled position.
Figure 12:
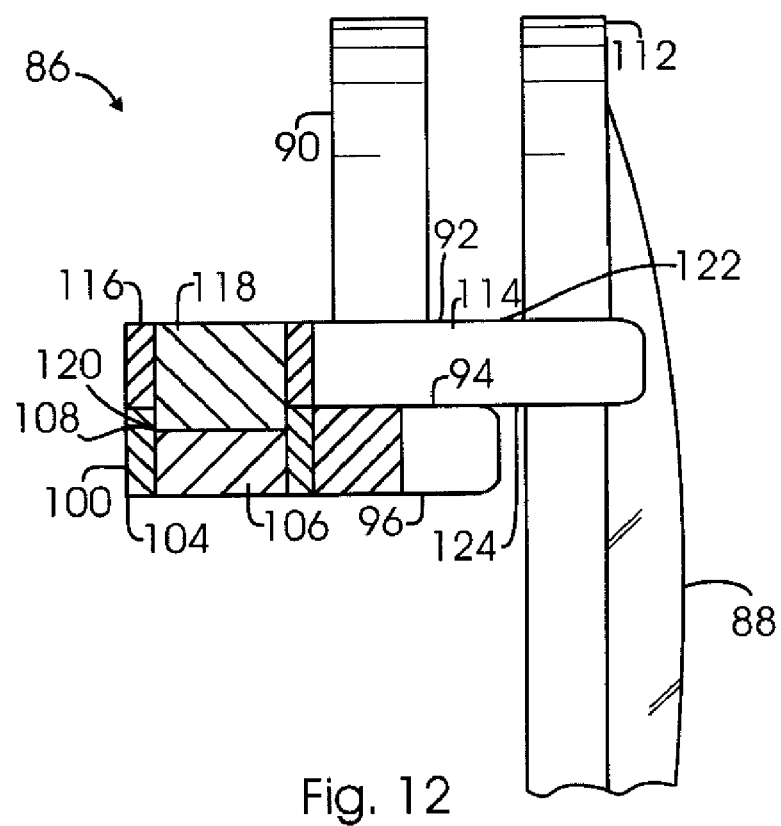
FIG. 12 illustrates a cross-sectional side view of the eyewear of FIG. 11 in a coupled position.

Each temple extension 100 further includes a socket 104 extending therefrom, preferably rearwardly, for coupling lens frame 92 to eyewear platform 90, as illustrated in FIGS. 9 and 11. Socket 104 is preferably round in shape and has a magnetic member 106 securely disposed therein, as illustrated in FIGS. 10 and 12. Although socket 104 is illustrated as being circular in shape, a practitioner skilled in the art will understand that socket 104 may have any shape as known in the art and, moreover, that magnetic member 106 need not be completely surrounded by socket 104. However, magnetic member 106 should be securely disposed within socket 104 and not removeable.

Each magnetic member 106 is preferably situated within its respective socket 104 so that a surface of magnetic member 106 forms a first mating surface 108. FIG. 9 shows the third preferred embodiment in which first mating surface 108 accessible on lower side 96 of platform 90. In this embodiment, first mating surface 108 is utilized for coupling lens frame 92 to eyewear platform 90 from lower side 96. FIG. 11 shows the fourth preferred embodiment in which first mating surface 108 accessible on upper side 94 of platform 90. In this embodiment, first mating surface 108 is utilized for coupling lens frame 92 to eyewear platform 90 from upper side 94.

Eyewear platform 90 further includes nose pads 110, as illustrated in FIGS. 9 and 11. It is contemplated that eyewear platform 90 will have a size and shape that may vary depending upon the material used to create platform 90. Platform 90 may be created from, for example, but not limited to, metal or plastic. Further, it is contemplated that arms 102 and nose pads 110 may be created from a like or different material. For example, nose pads 110 may be cushioned or formed of a more pliable plastic while platform 90 may be made of metal.

As further illustrated in FIGS. 9 and 11, the third and fourth preferred embodiments of the present invention include a lens frame 92 that has lens holders 112 that contain lenses 88. Although lens holders 112 as illustrated in FIGS. 9 and 11 are shown as completely encircling and encompassing each lens 88, practitioners skilled in the art will understand that various embodiments may exist, including wherein only a portion of lens 88 may be contained within lens holder 112 (not shown).

At opposing terminal ends of lens frame 92 are frame extensions 114. Each frame extension 114 further comprises an extension socket 116. Each extension socket 116 is positioned such that it will align with a corresponding socket 104 in eyewear platform 90 when lens frame 92 is coupled to eyewear platform 90.

Each extension socket 116 in lens frame 92 preferably houses a magnetic member 118. Magnetic member 118 can be situated in a variety of different positions within extension socket 116 to form a second mating surface 120 depending upon how magnetic member 106 in socket 104 of temple extension 100 is positioned. In the third preferred embodiment as shown in FIGS. 9 and 10, second mating surface 120 is accessible on an upper side 122 of lens frame 92 and is secured to first mating surface 108 by magnetic attraction and lenses 88 may be removably secured to platform 90. In the fourth preferred embodiment as shown in FIGS. 11 and 12, second mating surface 120 is accessible on a lower side 124 of lens frame 92 and is secured to first mating surface 108 by magnetic attraction and lenses 88 may be removably secured to platform 90.

In the third preferred embodiment, lens frame 92 is designed to couple to eyewear platform 90 from the bottom, as illustrated in FIGS. 9 and 10. In this embodiment, lenses 88 in lens frame 92 extend just in front of eyewear platform 90. In the fourth preferred embodiment, lens frame 92 is designed to couple to eyewear platform 90 from the top, as illustrated in FIGS. 11 and 12. Practitioners skilled in the art will understand that lens frame 92 will have a size and shape depending upon the size and shape of eyewear platform 90 and the material used to create lens frame 92 may be the same as or different from the material used to create eyewear platform 90.

In the third and fourth preferred embodiments, a rearward reflection coating 126 is included on a portion of the rear side of lenses 88. Preferably, reflective coating 126 is provided on an outer portion or quadrant of lenses 88, as illustrated in FIG. 9. Reflective coating 126 can cover from one-fourth to one-third of lenses 88 and provide an effective rear view mirror, as illustrated in FIG. 9. FIG. 11 illustrates an alternate embodiment with a reflective coating 128 that is included on only an upper portion of an outer quadrant of lenses 88 and covering only fifteen to twenty percent of lenses 88.

Referring to FIGS. 10 and 12, there are illustrated cross-sectional side views of the third and fourth preferred embodiments of the present invention in order to further demonstrate the coupling of lens frame 92 to eyewear platform 90. In the illustrated embodiments of the third and fourth preferred embodiments, magnetic member 106 is positioned within socket 104 such that first mating surface 108 is elevated and magnetic member 118 is positioned within socket 116 such that second mating surface 108 is recessed, as shown in FIGS. 10 and 12. In an alternate embodiments (not shown), magnetic member 106 is positioned within socket 104 such that first mating surface 108 is recessed and magnetic member 118 is positioned within socket 116 such that second mating surface 120 is elevated.

FIGS. 13 to 15b illustrate the fifth preferred embodiment of the present invention of eyewear 130 that includes lenses 134 and 136 that are removably secured to an eyewear platform 132, is provided. Eyewear 130 includes eyewear platform 132, a pair of primary lenses 134 and a pair of auxiliary lenses 136.

Figure 13:
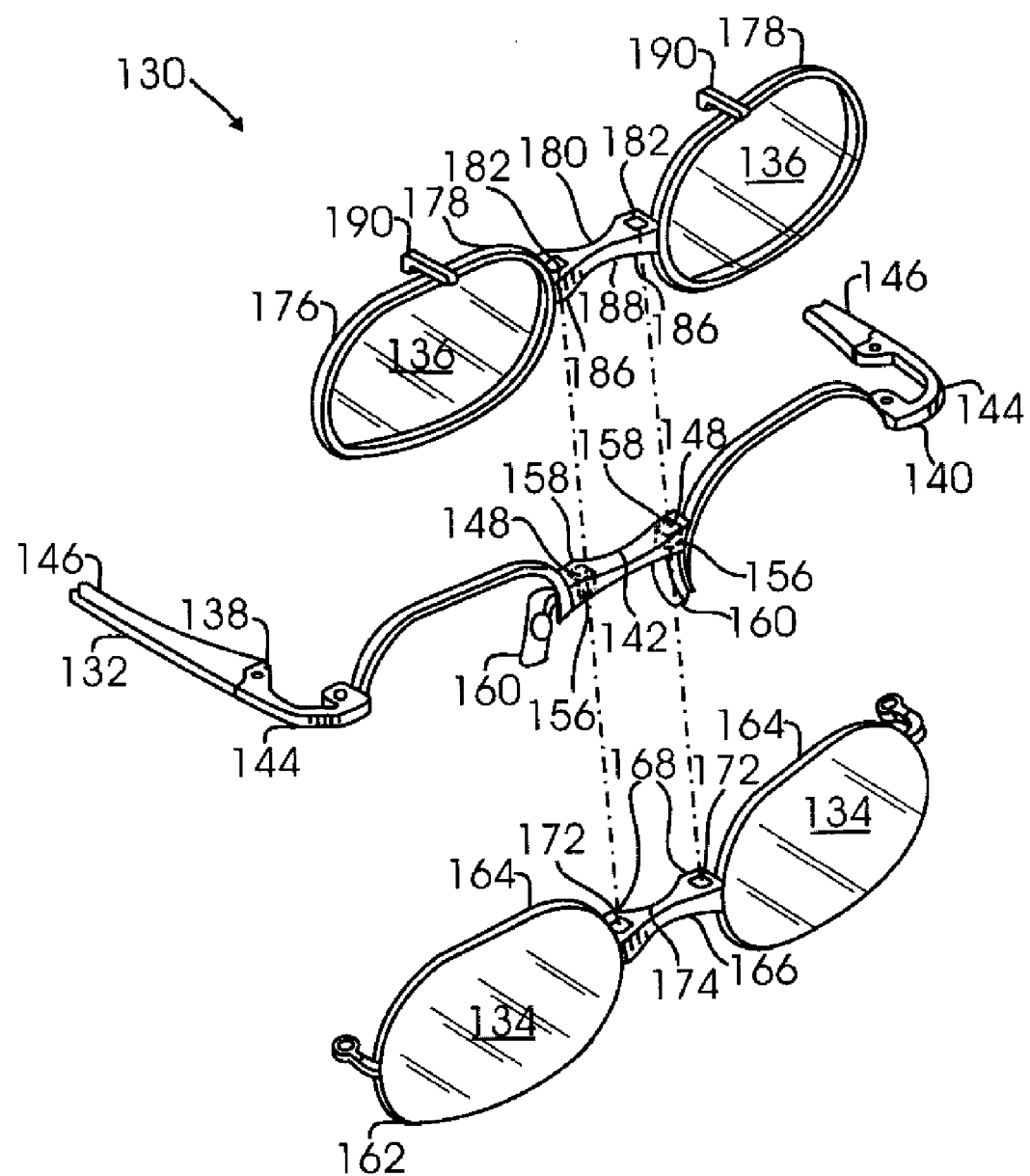
FIG. 13 illustrates an exploded view of eyewear including an eyewear platform, a primary lens frame and an auxiliary lens frame in accordance with a fifth preferred embodiment of the present invention.

Eyewear platform 132 has an upper side 138, a lower side 140, a bridge portion 142, a pair of temple extensions 144 and a pair of arms 146, as best illustrated in FIG. 13. Each temple extension 144 is located at an opposite end of bridge portion 142, as illustrated in FIG. 13. Arms 146 are pivotally coupled to eyewear platform 132 at each temple extension 144. Arms 146 can be adjustably connected to platform 132 through a variety of different adjustable connections including, but not limited to, a spring, hinge or joint, among other connections. Arms 146 are capable of being placed over a user's ears with bridge portion 142 resting on the user's nose to permit eyewear platform 132 to be used by a user.

Figure 15A:
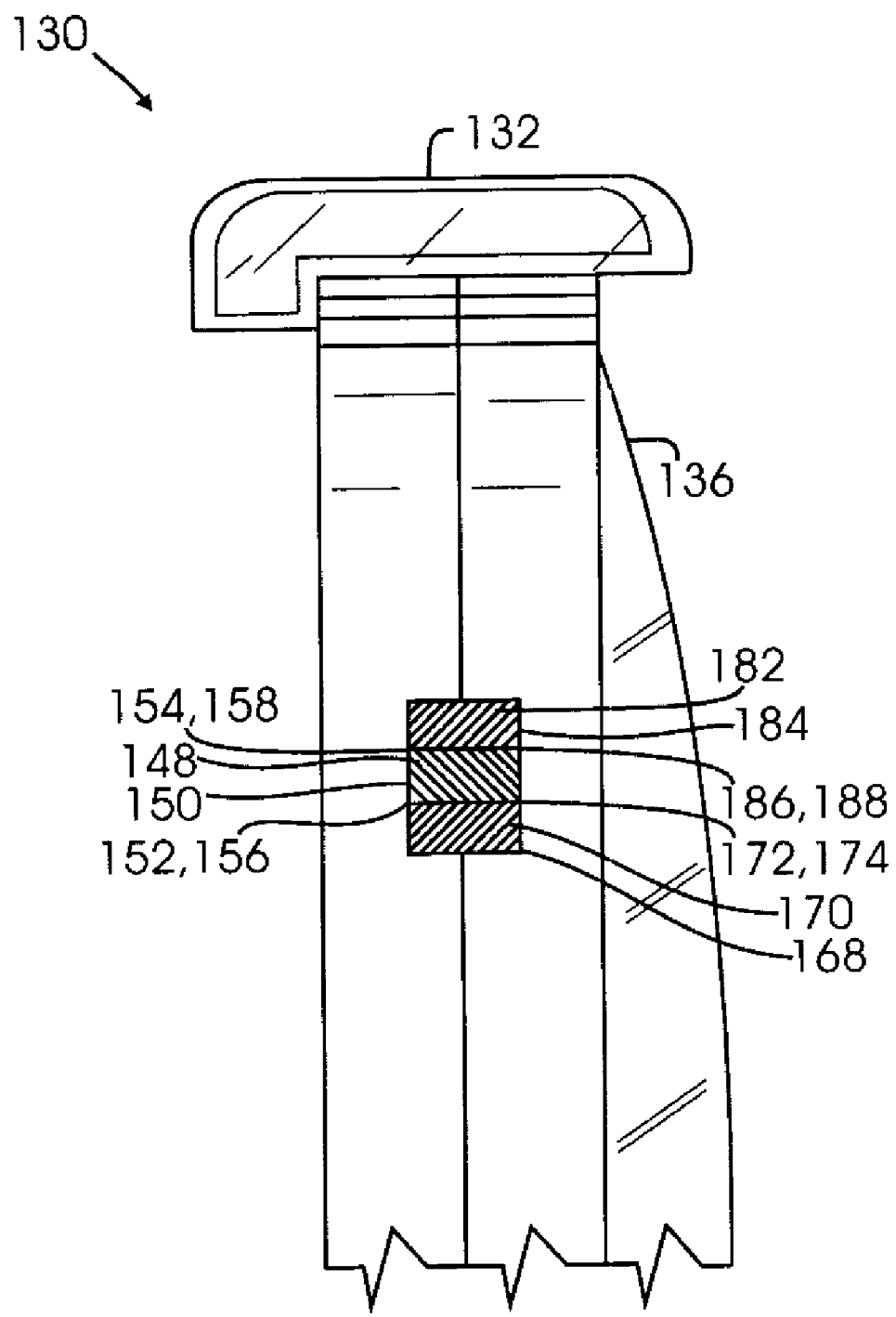
FIG. 15a illustrates a sectional view taken along line 15-15 of FIG. 14.
Figure 15B:
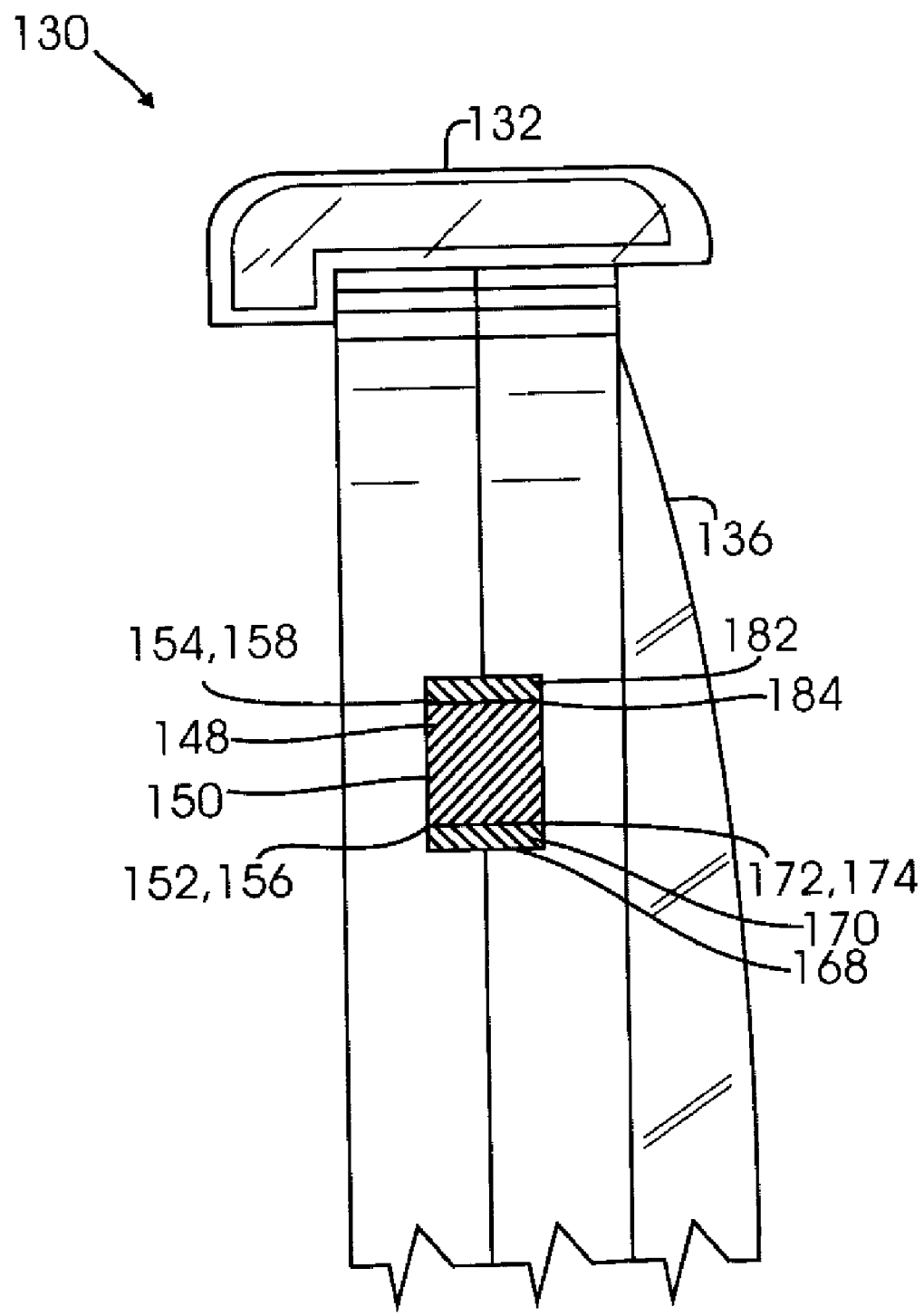
FIG. 15b illustrates a sectional view taken along line 15-15 of an alternate embodiment of FIG. 14.

Each bridge portion 142 further includes at least one socket 148 extending through for coupling both primary lenses 134 and auxiliary lenses 136 to eyewear platform 132, as illustrated in FIG. 13. Socket 148 is preferably round or square in shape and has a magnetic member 150 securely disposed therein, as illustrated in FIGS. 15a and 15b. Although socket 148 is illustrated as being square in shape, a practitioner skilled in the art will understand that socket 148 may have any shape as known in the art and, moreover, that magnetic member 150 need not be completely surrounded by socket 148. However, magnetic member 150 should be securely disposed within socket 148 and not removeable.

Each magnetic member 150 is preferably situated within its respective socket 148 such that both bottom and top surfaces 152 and 154, respectively, are exposed on opposite sides of socket 148 and, accordingly, forming a first mating surface 156 accessible on lower side 140 of platform 132 and a second mating surface 158 accessible on upper side 138 of platform 132. In the fifth preferred embodiment, first mating surface 156 is utilized for coupling primary lenses 134 to eyewear platform 132 from lower side 140 and second mating surface 158 is utilized for coupling auxiliary lenses 136 to eyewear platform 132 from upper side 138.

Eyewear platform 132 further includes nose pads 160, as illustrated in FIG. 13. It is contemplated that eyewear platform 132 will have a size and shape that may vary depending upon the material used to create platform 132. Platform 132 may be created from, for example, but not limited to, metal or plastic. Further, it is contemplated that arms 146 and nose pads 160 may be created from a like or different material. For example, nose pads 160 may be cushioned or formed of a more pliable plastic while platform 132 may be made of metal.

As further illustrated in FIG. 13, the fifth preferred embodiment of the present invention includes a primary lens frame 162 that has lens holders 164 that contain primary lenses 134. Although lens holders 164 as illustrated in FIG. 13 are shown as completely encircling and encompassing each lens 134, practitioners skilled in the art will understand that various embodiments may exist, including wherein only a portion of lens 134 may be contained within lens holder 164 (not shown).

In the center of primary lens frame 162 is bridge 166. Bridge 166 includes at least one socket 168. Each bridge socket 168 is positioned such that it will align with a corresponding socket 148 in eyewear platform 132 when primary lens frame 162 is coupled to eyewear platform 132.

Each bridge socket 168 in primary lens frame 162 preferably houses a magnetic member 170. Magnetic member 170 can be situated in a variety of different positions within bridge socket 168 depending upon how magnetic member 150 in socket 148 of eyewear platform 132 is positioned. In the fifth preferred embodiment as shown in FIG. 13, at least one third mating surface 172 is accessible on an upper side 174 of primary lens frame 162 that is secured to first mating surface 156 by magnetic attraction and primary lenses 134 may be removably secured to platform 132.

As shown in FIG. 13, primary lens frame 162 is preferably designed to couple to eyewear platform 132 from the bottom. Practitioners skilled in the art will understand that primary lens frame 162 will have a size and shape depending upon the size and shape of eyewear platform 132 and the material used to create primary lens frame 162 may be the same as or different from the material used to create eyewear platform 132.

As further illustrated in FIG. 13, the fifth preferred embodiment of the present invention includes an auxiliary lens frame 176 that has lens holders 178 that contain auxiliary lenses 136. Although lens holders 178 as illustrated in FIG. 13 are shown as completely encircling and encompassing each lens 136, practitioners skilled in the art will understand that various embodiments may exist, including wherein only a portion of lens 136 may be contained within lens holder 178 (not shown) or where no lens holder 178 exists and only auxiliary lenses 138 are present (not shown).

In the center of auxiliary lens frame 176 is auxiliary bridge 180. Auxiliary bridge 180 further comprises at least one auxiliary socket 182. Each auxiliary socket 182 is positioned such that it will align with a corresponding socket 148 of eyewear platform 132.

Each auxiliary socket 182 in auxiliary lens frame 176 preferably houses a magnetic member 184. Magnetic member 184 can be situated in a variety of different positions within auxiliary socket 182, depending upon how a corresponding magnetic member 150 in socket 148 of eyewear platform 132 is positioned. In the fifth preferred embodiment as shown in FIG. 13, at least one fourth mating surface 186 is accessible on a lower side 188 of auxiliary lens frame 176 that is secured to second mating surface 158 by magnetic attraction and auxiliary lenses 136 may be removably secured to platform 132.

Figure 14:
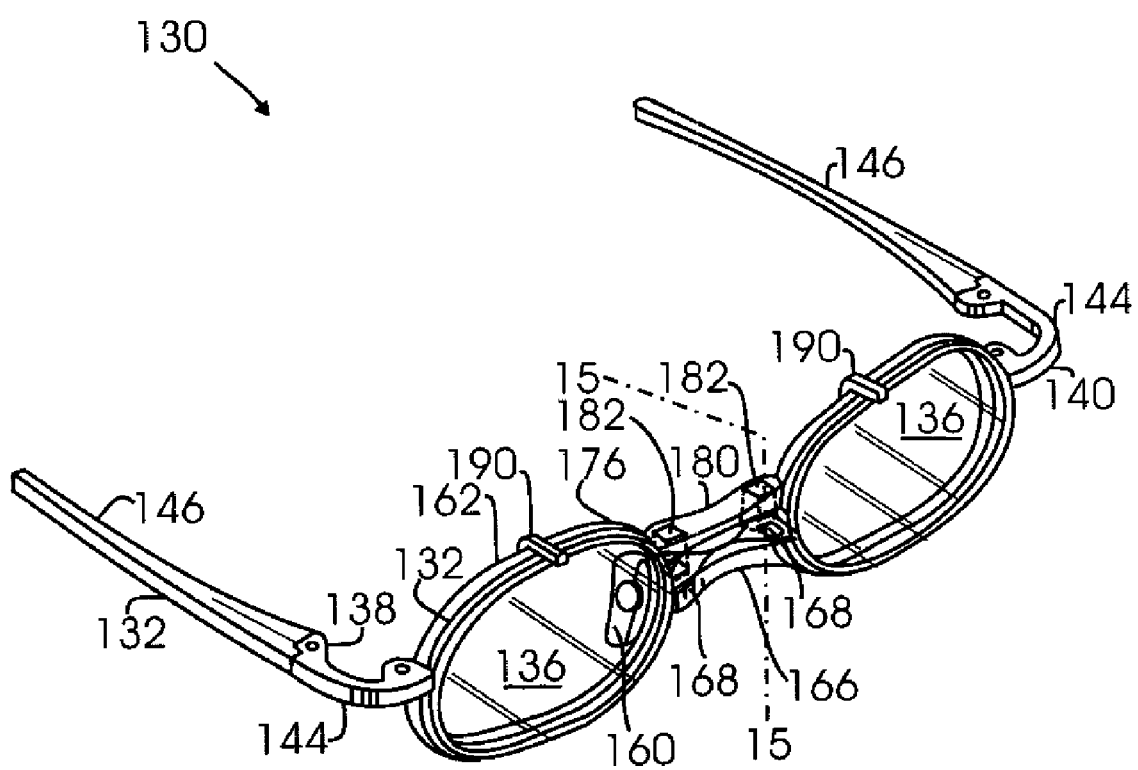
FIG. 14 illustrates a perspective view of the eyewear of FIG. 13 in a coupled position.

As shown in FIG. 13, auxiliary lens frame 176 is preferably designed to couple to eyewear platform 132 from the top. In this way, auxiliary lenses 136 in auxiliary lens frame 176 extend just in front of both primary lenses 134 and eyewear platform 132. Clips 190 for locking auxiliary lens frame 176 and primary lens frame 162 onto eyewear platform 132 maybe included on an upper quadrant of auxiliary lens frame 176 that fit over eyewear platform 132 and primary lens frame 162, as shown in FIG. 14. Practitioners skilled in the art will understand that auxiliary lens frame 176 will have a size and shape depending upon the size and shape of eyewear platform 132 and the material used to create auxiliary lens frame 176 may be the same as or different from the material used to create eyewear platform 132.

Referring to FIGS. 15a and 15b, there is shown various cross-sectional side views of the fifth preferred embodiment of the present invention in order to further demonstrate the coupling of primary lens frame 162 and auxiliary lens frame 176 to eyewear platform 132. As shown in FIG. 15a, magnetic member 150 may be disposed within socket 148 such that bottom and top surfaces 152 and 154, respectively, of magnetic member 150 are recessed within socket 148. Alternatively, as shown in FIG. 15b, magnetic member 150 may be positioned within socket 148 such that bottom and top surfaces 152 and 154, respectively, of magnetic member 150 extend above and below socket 148.

As explained earlier, magnetic member 170 of primary lens frame 162 may be situated in a variety of different positions within bridge socket 168, depending on how magnetic member 170 is positioned within socket 148 of eyewear platform 132. For example, as illustrated in FIG. 15a, if magnetic member 150 is recessed within socket 148 such that bottom surface 152 is within socket 148, then magnetic member 170 is situated within bridge socket 168 of primary lens frame 162 such that it extends outward in order to magnetically couple with magnetic member 150 when primary lens frame 162 is coupled to eyewear platform 132. Alternatively, as illustrated in FIG. 15b, if magnetic member 150 is positioned within socket 168 of eyewear platform 132 such that bottom surface 152 extends out of socket 168, then magnetic member 170 is recessed within bridge socket 168 of primary lens frame 162 so that magnetic member 150 will magnetically couple with magnetic member 170 when primary lens frame 162 is coupled to eyewear platform 132.

Further, as explained earlier, magnetic member 184 of auxiliary lens frame 176 may be situated in a variety of different positions within auxiliary socket 182. Referring again to FIG. 15a, if magnetic member 150 is recessed within socket 148 such that top surface 154 is within socket 148, then magnetic member 184 is situated within auxiliary socket 182 of auxiliary lens frame 176 such that it extends outward to magnetically couple with magnetic member 150 when auxiliary lens frame 176 is coupled to eyewear platform 132.

Alternatively, as illustrated in FIG. 15b, if magnetic member 150 is positioned within socket 148 of eyewear platform 132 such that top surface 154 of magnetic member 150 extends above socket 148, then magnetic member 184 is recessed within auxiliary socket 182 of auxiliary lens frame 176 so that magnetic member 150 fits within socket 182 and magnetically couples with magnetic member 184 when auxiliary lens frame 176 is coupled to eyewear platform 132.

FIGS. 16a through 18b illustrate a sixth preferred embodiment of the present invention of eyewear 192 that includes lenses 194 that are removably secured to an eyewear platform 196. Eyewear 192 includes eyewear platform 196 and a pair of lenses 194. In the illustrated embodiment, lenses 194 are on a lens frame 198. However, in an alternate embodiment (not shown) lenses 194 may attach to platform 196 without lens frame 198.

As illustrated in FIG. 16a, eyewear platform 196 has a front side 200, a rear side 202, a bridge portion 204, a pair of temple extensions 206 and a pair of arms 208. Each temple extension 206 is located at an opposite end of bridge portion 204, as illustrated in FIG. 16a. Arms 208 are pivotally coupled to eyewear platform 196 at each temple extension 206. Arms 208 can be adjustably connected to platform 196 through a variety of different adjustable connections including, but not limited to, a spring, hinge or joint, among other connections. Arms 208 are capable of being placed over a user's ears with bridge portion 204 resting on the user's nose to permit eyewear platform 196 to be used by a user.

Bridge portion 204 further includes at least one socket 210 for extending there through, preferably on front side 200, for coupling lens frame 198 to eyewear platform 196, as illustrated in FIGS. 16a to c and 18a and b. Socket 210 has a magnetic member 212 securely disposed therein, as illustrated by FIGS. 16a to c and 18 and b. A practitioner skilled in the art will understand that socket 210 may have any shape as known in the art and, moreover, that magnetic member 212 need not be completely surrounded by socket 210. However, magnetic member 212 should be securely disposed within socket 210 and not removeable. In FIGS. 16a and b, magnetic member 212 extends outside of socket 210. However, in FIG. 16c, magnetic member 212 is recessed within socket 210.

Each magnetic member 212 is preferably situated within socket 210 so that a surface of magnetic member 212 forms a first mating surface 214. FIGS. 16a to c show the sixth preferred embodiment in which first mating surface 214 is accessible on front side 200 of platform 196. In this embodiment, first mating surface 214 is utilized for coupling lens frame 198 to eyewear platform 196 from front side 200.

Figures 18A, 18B:
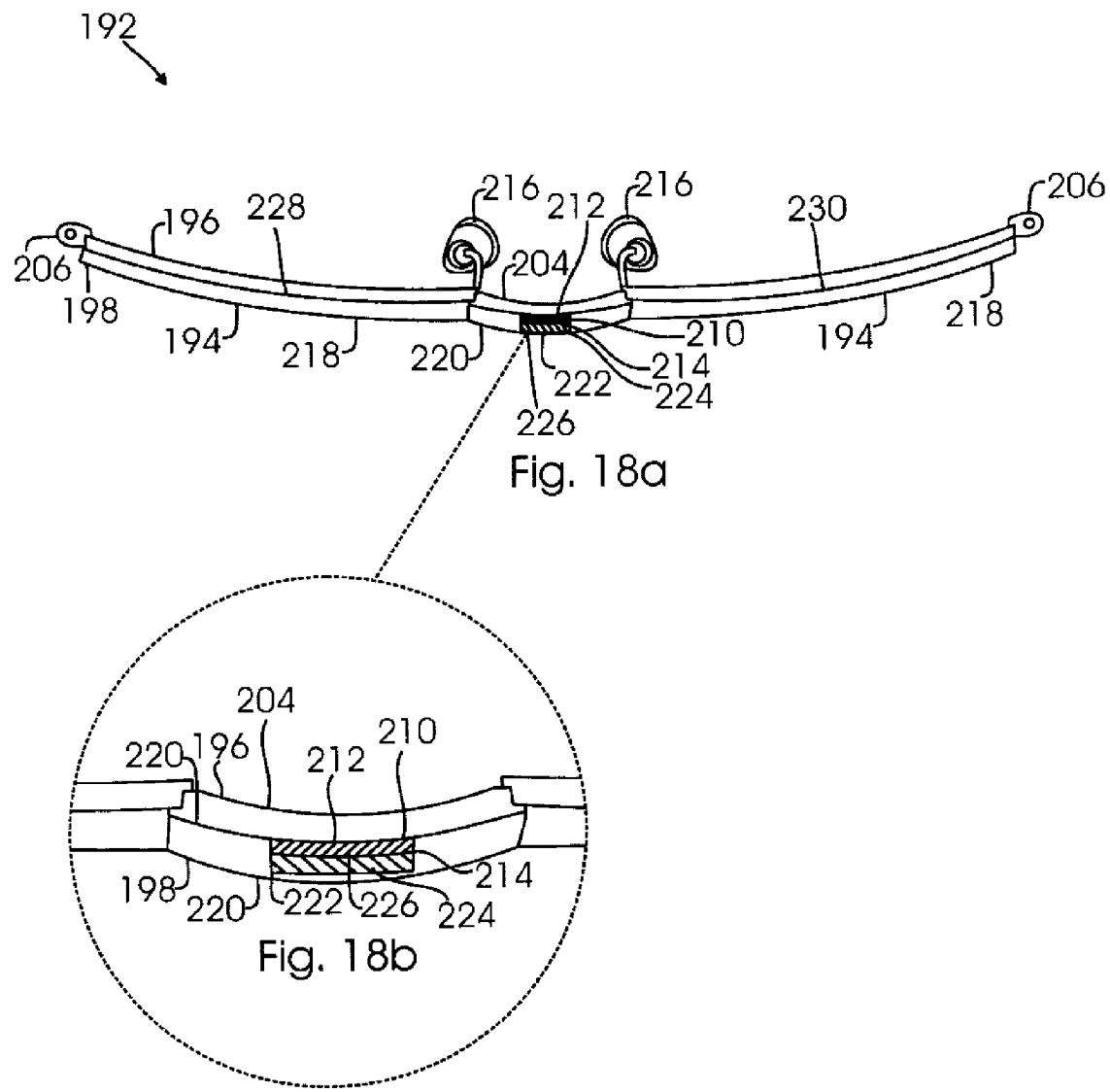

Eyewear platform 196 further includes nose pads 216, as illustrated in FIGS. 16a and 18a. It is contemplated that eyewear platform 196 will have a size and shape that may vary depending upon the material used to create platform 196. Platform 196 may be created from, for example, but not limited to, metal or plastic. Further, it is contemplated that arms 208 and nose pads 216 may be created from a like or different material. For example, nose pads 216 may be cushioned or formed of a more pliable plastic while platform 196 may be made of metal.

As further illustrated in FIGS. 17a to b and 18a to b, the sixth preferred embodiment of the present invention include a lens frame 198 that has lens holders 218 that contain lenses 194. Although lens holders 218 may completely encircling and encompassing each lens 194 or only a portion of lens 194 may be contained within lens holder 218 (not shown).

In the center of lens frame 198 is bridge portion 220 that contains at least one socket 222. Each bridge socket 222 is positioned such that it will align with socket 210 in eyewear platform 196 when lens frame 198 is coupled to eyewear platform 196.

Figure 17A:
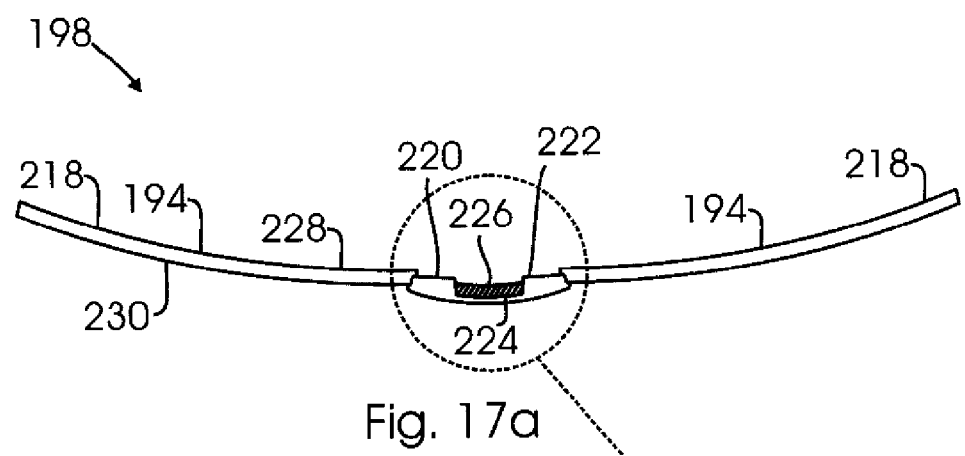
FIG. 17a illustrates a top perspective view of a removable lens frame in accordance with the sixth preferred embodiment.
Figure 17B:
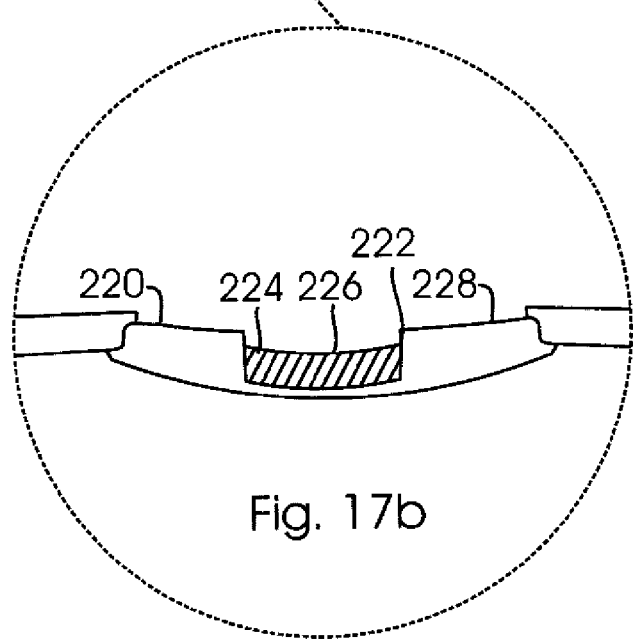

Bridge socket 222 in lens frame 198 preferably houses a magnetic member 224. Magnetic member 224 can be situated in a variety of different positions within bridge socket 222 to form a second mating surface 226 depending upon how magnetic member 224 in socket 222 of lens frame 198 is positioned. The illustrated embodiments of 17a to 18b show magnetic member 224 recessed within socket 222. However, magnetic member may also be elevated out of socket 222 (not shown). As shown in FIGS. 17a and b, second mating surface 226 is accessible on a rear side 228 of lens frame 198 and is secured to first mating surface 214 by magnetic attraction and lenses 194 may be removably secured to platform 196.

Lens frame 198 is designed to couple to eyewear platform 196 from rear side 228 and front side 200, as illustrated in FIGS. 18a to b. In this embodiment, lenses 194 in lens frame 198 extend just in front of eyewear platform 196. However, in an alternate embodiment (not illustrated), lens frame 198 couples to eyewear platform 196 from a front side 230. Practitioners skilled in the art will understand that lens frame 198 will have a size and shape depending upon the size and shape of eyewear platform 196 and the material used to create lens frame 198 may be the same as or different from the material used to create eyewear platform 196.

FIGS. 18a to b illustrates a top perspective view of eyewear platform 196 and lens frame 198 when coupled together. As illustrated, lens frame 198 is coupled to eyewear platform 196 from rear side 228 and magnetic member 224 is recessed within socket 222 and magnetic member 212 is elevated and extends outside of socket 210. However, in an alternate embodiment (not shown), magnetic member 224 is elevated and extends outside of socket 222 and magnetic member 212 is recessed within socket 210.

While the invention has been described with respect to certain preferred embodiments, as will be appreciated by those skilled in the art, it is to be understood that the invention is capable of numerous changes, modifications and rearrangements and such changes, modifications and rearrangements are intended to be covered by the following claims.

I claim:

1. Eyewear comprising:
   an eyewear platform having a bridge portion and at least one socket in proximity to said bridge portion, wherein each of said sockets has a first mating surface accessible on an upper side of said platform and a second mating surface accessible on a lower side of said platform;
   a pair of primary lenses with a third mating surface, wherein said third mating surface is secured to said upper first mating surface only by magnetic attraction and wherein said primary lenses may be removably secured to said platform; and
   a pair of auxiliary lenses having at least one fourth mating surface, wherein said fourth mating surface is secured to said lower second mating surface only by magnetic attraction and wherein said auxiliary lenses may be removably secured to said platform.

2. Eyewear comprising:
   an eyewear platform having a bridge portion and at least one socket in proximity to said bridge portion, wherein each of said sockets has a first mating surface accessible on an upper side of said platform and a second mating surface accessible on a lower side of said platform;
   a primary lens frame having a pair of primary lenses and a third mating surface accessible on a lower side of said primary lens frame, wherein said third mating surface is secured above said upper first mating surface only by magnetic attraction and wherein said primary lens frame may be removably secured to said platform; and
   a pair of auxiliary lenses having at least one fourth mating surface accessible on an upper side of said auxiliary lenses, wherein said fourth mating surface is secured below said lower second mating surface only by magnetic attraction and wherein said auxiliary lenses may be removably secured to said platform.

3. The eyewear of claim 2 wherein the socket in proximity to said bridge portion includes magnetic material mounted therein.

4. The eyewear of claim 3 further including at least one socket on said primary lens frame, wherein said socket includes magnetic material mounted therein.

* * * * *